(12) United States Patent
Hongyo et al.

(10) Patent No.: US 11,626,825 B2
(45) Date of Patent: Apr. 11, 2023

(54) ROTARY MACHINE CONTROL DEVICE, REFRIGERANT COMPRESSION DEVICE, REFRIGERATION CYCLE APPARATUS, AND AIR CONDITIONER

(71) Applicant: Mitsubishi Electric Corporation, Tokyo (JP)

(72) Inventors: Akane Hongyo, Tokyo (JP); Akira Satake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/613,954

(22) PCT Filed: Jul. 25, 2019

(86) PCT No.: PCT/JP2019/029255
§ 371 (c)(1),
(2) Date: Nov. 24, 2021

(87) PCT Pub. No.: WO2021/014650
PCT Pub. Date: Jan. 28, 2021

(65) Prior Publication Data
US 2022/0231627 A1    Jul. 21, 2022

(51) Int. Cl.
*H02P 25/18*     (2006.01)
*H02P 27/06*     (2006.01)

(52) U.S. Cl.
CPC .............. *H02P 25/18* (2013.01); *H02P 27/06* (2013.01)

(58) Field of Classification Search
CPC ...... H02P 25/18; H02P 27/06; H02P 2205/01; H02P 27/08
See application file for complete search history.

(56) References Cited

U.S. PATENT DOCUMENTS 8,497,651 B2 * 7/2013 Tang ................. H02H 7/09
                                                  318/434
8,947,028 B2 * 2/2015 Gu ..................... H02P 29/0241
                                                  361/31

(Continued)

FOREIGN PATENT DOCUMENTS

JP    4-355697 A    12/1992
JP    6-54550 A     2/1994

(Continued)

OTHER PUBLICATIONS

International Search Report and Written Opinion dated Oct. 15, 2019, received for PCT Application PCT/JP2019/029255, Filed on Jul. 25, 2019, 7 pages including English Translation.

*Primary Examiner* — Thai T Dinh
(74) *Attorney, Agent, or Firm* — Xsensus LLP

(57) ABSTRACT

A rotary machine control device includes a voltage application unit that applies a voltage to a rotary machine with three phases, a current detection unit that outputs current information representing information on a current caused to flow to the rotary machine by application of the voltage, a control unit that outputs a voltage command to apply a voltage between each of pairs of the phases of the rotary machine, and an open phase determination unit that performs open phase determination to determine whether an open phase occurs in the rotary machine, by detecting the values of currents flowing between the respective pairs of the phases by monitoring the voltage command and the current information, and by comparing the sum of the values of the currents flowing between the respective pairs of the phases with a predetermined reference value.

7 Claims, 11 Drawing Sheets

(56) References Cited

U.S. PATENT DOCUMENTS

| | | | | |
|---|---|---|---|---|
| 9,160,161 B2* | 10/2015 | Li | ........................ | H02H 7/1227 |
| 11,177,751 B2* | 11/2021 | Min | ...................... | H02P 25/064 |
| 2016/0365811 A1* | 12/2016 | Senoo | ..................... | H02P 21/22 |

FOREIGN PATENT DOCUMENTS

| JP | 2005-269854 A | 9/2005 |
|---|---|---|
| JP | 2007-143244 A | 6/2007 |
| JP | 2015-142462 A | 8/2015 |

* cited by examiner

ROTARY MACHINE CONTROL DEVICE, REFRIGERANT COMPRESSION DEVICE, REFRIGERATION CYCLE APPARATUS, AND AIR CONDITIONER

CROSS-REFERENCE TO RELATED APPLICATION

The present application is based on PCT filing PCT/JP2019/029255, filed Jul. 25, 2019, the entire contents of which are incorporated herein by reference.

FIELD

The present invention relates to a rotary machine control device that controls operation of a rotary machine, to a refrigerant compression device, to a refrigeration cycle apparatus, and to an air conditioner.

BACKGROUND

A rotary machine includes multiple windings therein, and the multiple windings are connected, through wires, to a rotary machine control device that controls rotation of the rotary machine. Disconnection of a wire prevents the rotary machine control device from normally rotating the rotary machine. This creates a need for determination of whether there is disconnection of a wire. Determination of whether there is disconnection of a wire with respect to each winding, i.e., on a per phase basis, is called open phase determination. Patent Literature 1 discloses a rotary machine control device that performs open phase determination such that the inverter applies a pulse-shaped voltage to each phase of the rotary machine one by one, and the magnitude of a direct current (DC) bus current of each phase that flows upon application of the pulse-shaped voltage is compared with a reference value.

CITATION LIST

Patent Literature

Patent Literature 1: Japanese Patent Application Laid-open No. 2007-143244

SUMMARY

Technical Problem

When the rotary machine is rotated by external force or inertia, the magnitude of the DC bus current depends not only on the voltage applied by the inverter, but also on motional electromotive force. Motional electromotive force is electromotive force generated in proportion to the number of rotations of the rotary machine per unit time. Thus, the rotary machine control device described in Patent Literature 1 is not capable of obtaining a correct value of the DC bus current when the rotary machine is rotated by external force or inertia. This presents a problem in that the rotary machine control device described in Patent Literature 1 has reduced accuracy of open phase determination when the open phase determination is performed during rotation of the rotary machine.

The present invention has been made in view of the foregoing, and it is an object of the present invention to provide a rotary machine control device capable of performing open phase determination with high accuracy even when the rotary machine is rotating.

Solution to Problem

In order to solve the above-described problems and achieve the object, a rotary machine control device includes: a voltage application unit to apply a voltage to a rotary machine with three phases; a current detection unit to output current information representing information on a current caused to flow to the rotary machine by application of the voltage; a control unit to output a voltage command to apply a voltage between each of pairs of the phases of the rotary machine; and an open phase determination unit to perform open phase determination to determine whether an open phase occurs in the rotary machine, by detecting values of currents flowing between the respective pairs of the phases by monitoring the voltage command and the current information, and by comparing a sum of the values of the currents flowing between the respective pairs of the phases with a predetermined reference value.

Advantageous Effects of Invention

The present invention can advantageously provide a rotary machine control device capable of performing open phase determination with high accuracy even when the rotary machine is rotating.

DESCRIPTION OF EMBODIMENTS

A rotary machine control device, a refrigerant compression device, a refrigeration cycle apparatus, and an air conditioner according to embodiments of the present invention will be described in detail below with reference to the drawings. Note that these embodiments are not intended to limit the scope of this invention.

First Embodiment

Figure 1:
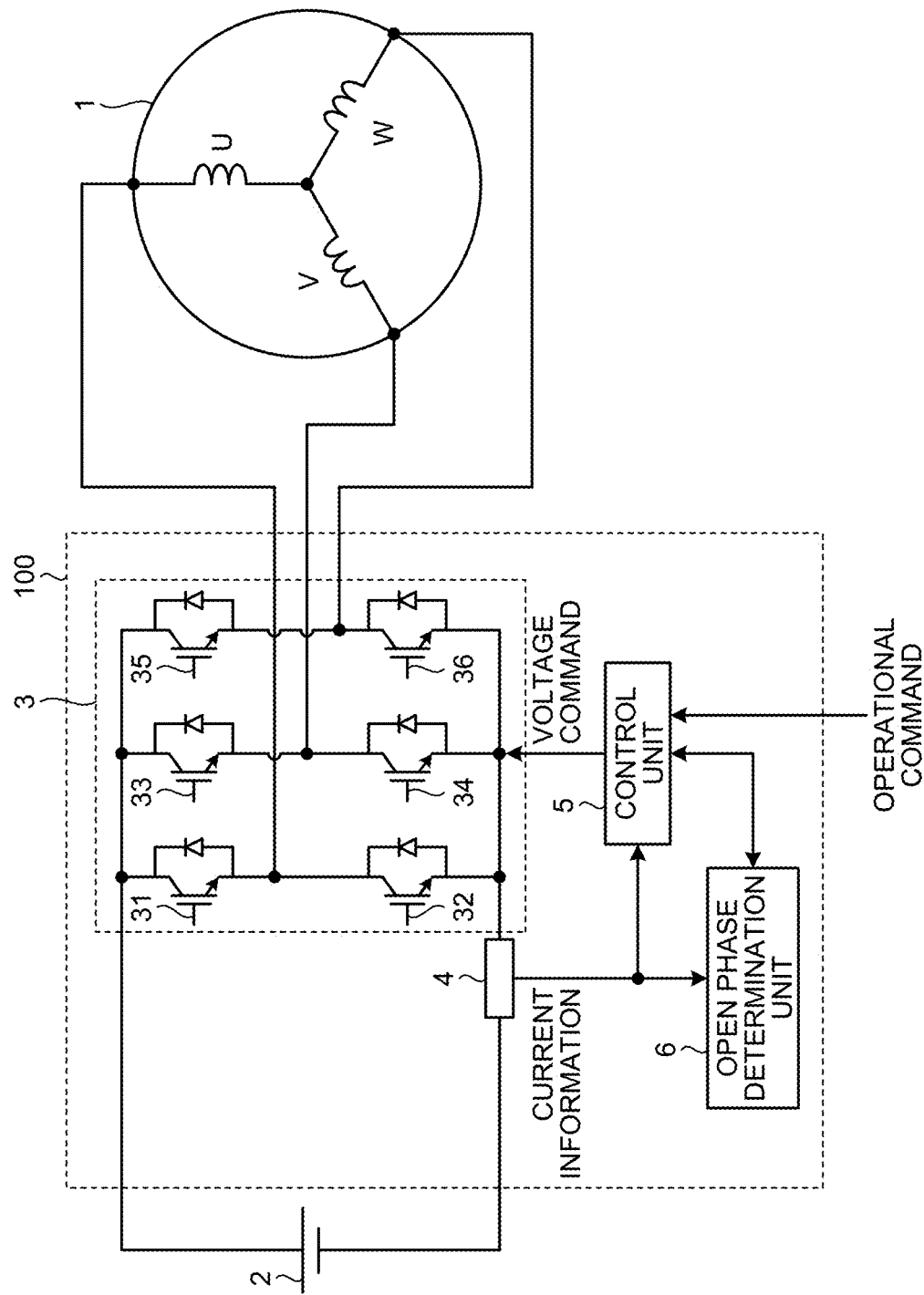
FIG. 1 is a diagram illustrating a configuration of a rotary machine control device according to a first embodiment of the present invention.

FIG. 1 is a diagram illustrating a configuration of a rotary machine control device 100 according to a first embodiment of the present invention. The rotary machine control device 100 is connected with a three-phase rotary machine 1 and a direct current (DC) voltage source 2. The rotary machine control device 100 controls operation of the rotary machine 1. The rotary machine control device 100 includes a voltage application unit 3, a current detection unit 4, a control unit 5, and an open phase determination unit 6.

The voltage application unit 3 converts a DC voltage $V_{dc}$ supplied from the DC voltage source 2 into an alternating current (AC) voltage, and applies the AC voltage to the rotary machine 1. The first embodiment assumes that the voltage application unit 3 is a three-phase voltage source inverter. The voltage application unit 3 includes switching devices 31 to 36. The voltage application unit 3 turns on or off each of the switching devices 31 to 36 independently based on a voltage command output from the control unit 5, and thus controls the voltage applied to the rotary machine 1.

The current detection unit 4 detects the current value of a current flowing to the rotary machine 1, and outputs current information representing the value of the current detected, to the control unit 5 and to the open phase determination unit 6. In the first embodiment, the current detection unit 4 detects a current flowing to the rotary machine 1 using a single-shunt current detection technique, in which a current value is detected using a shunt resistor provided on the negative DC bus of the voltage application unit 3. However, the technique for detecting a current by the current detection unit 4 is not limited to this technique. The current detection unit 4 may be a current sensor using an instrument current transformer called current transformer (CT).

The control unit 5 generates a voltage command based on an operational command, such as a velocity command or a torque command, input from an external device, and outputs the voltage command to the voltage application unit 3 to control the voltage application unit 3. The control unit 5 outputs the voltage command also to the open phase determination unit 6. The control unit 5 may control the voltage application unit 3 using a method such as, for example, constant V/f control, in which a voltage proportional to the operational frequency of the rotary machine 1 is output; vector control, in which the current flowing to the rotary machine 1 is controlled using a rotating coordinate system; or direct torque control, in which the magnetic flux and the torque of the rotary machine 1 are controlled. The control unit 5 may control the voltage application unit 3 using any control method among constant V/f control, vector control, direct torque control, and the like.

In a case in which the control unit 5 uses vector control or direct torque control to control the voltage application unit 3, the control unit 5 needs to obtain information on the phase of the rotary machine 1. The control unit 5 may obtain information on the phase of the rotary machine 1 by using a position sensor such as a rotary encoder or a resolver (not illustrated), or may estimate information on the phase using the value of a current flowing to the rotary machine 1 and the voltage command to be output to the voltage application unit 3, without using a position sensor.

The open phase determination unit 6 determines whether there is disconnection of an internal wire of the rotary machine 1 or of a power distribution line to the rotary machine 1, that is, performs open phase determination. When the open phase determination unit 6 determines that an open phase has occurred, the control unit 5, for example, controls the voltage application unit 3 such that all the switching devices 31 to 36 are turned off, or controls the voltage application unit 3 such that the rotational speed of the rotary machine 1 is gradually reduced and then the rotary machine 1 is stopped. In addition, the control unit 5 provides an indication using sound or light to inform the user that an open phase has occurred to perform appropriate protection operation such as fault notification to an external device. The open phase determination performed by the open phase determination unit 6 will be described in detail later.

A hardware configuration of the control unit 5 and of the open phase determination unit 6 according to the first embodiment of the present invention will now be described. The control unit 5 and the open phase determination unit 6 are implemented in processing circuitry, which is an electronic circuit that performs processing tasks.

Figure 2:
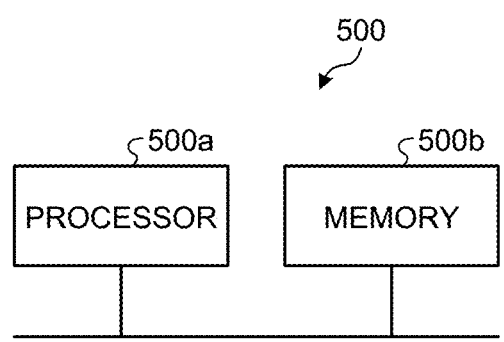
FIG. 2 is a diagram illustrating an example configuration of a control circuit according to the first embodiment of the present invention.

The processing circuitry according to the first embodiment of the present invention may be a dedicated hardware element or a control circuit including a memory and a central processing unit (CPU) that executes a program stored in the memory. The memory described herein may be a non-volatile or volatile semiconductor memory such as, for example, a random access memory (RAM), a read-only memory (ROM), or a flash memory. FIG. 2 is a diagram illustrating an example configuration of a control circuit 500 according to the first embodiment of the present invention. In a case in which the processing circuitry is a dedicated hardware element, the processing circuitry is, for example, an application specific integrated circuit (ASIC), a field programmable gate array (FPGA), or a combination thereof.

As illustrated in FIG. 2, the control circuit 500 includes a processor 500a, which is a CPU, and a memory 500b. In a case in which the control unit 5 and the open phase determination unit 6 are implemented by the control circuit 500 illustrated in FIG. 2, they are implemented by the processor 500a by reading and executing a program corresponding to each processing, stored in the memory 500b. The memory 500b is also used as a temporary memory for processing performed by the processor 500a.

Figure 3:
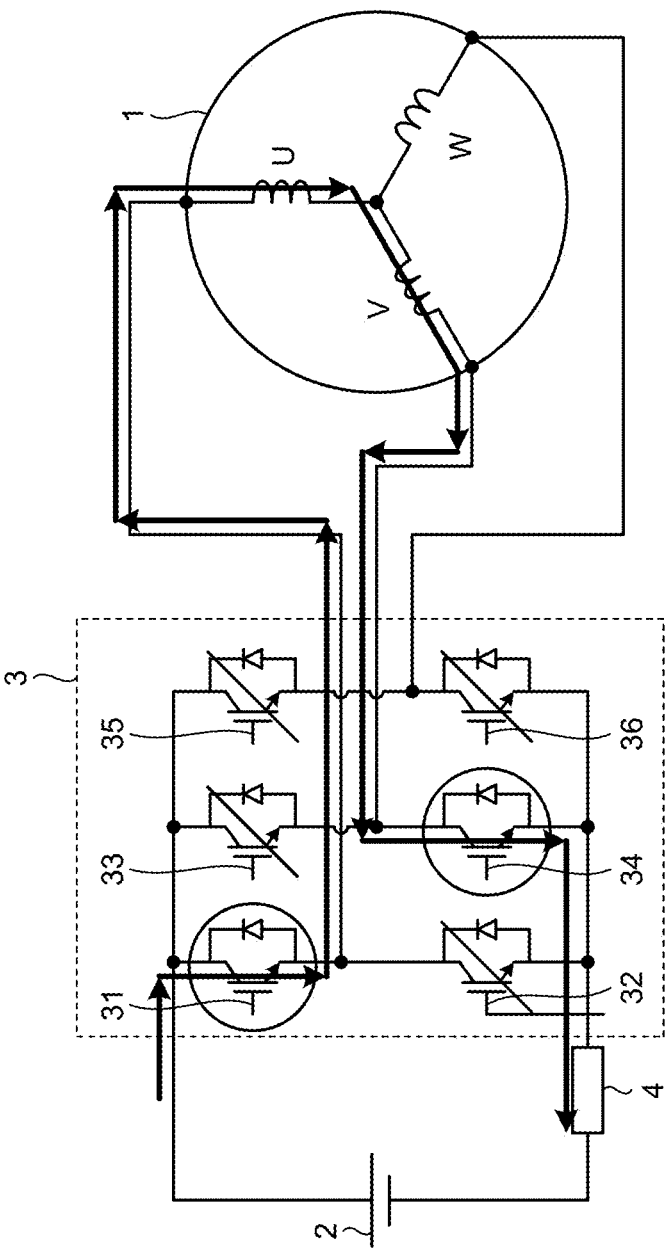
FIG. 3 is a first diagram illustrating a current flowing through the rotary machine control device and through a rotary machine when open phase determination is performed by the rotary machine control device according to the first embodiment of the present invention.
Figure 4:
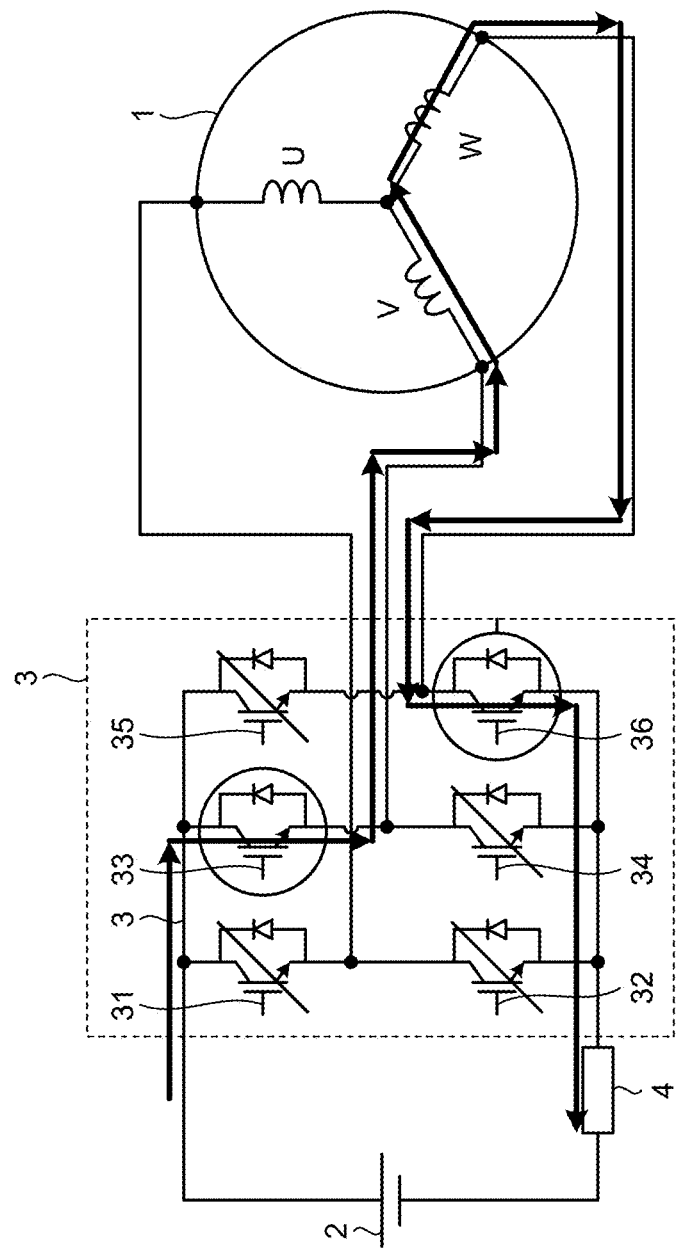
FIG. 4 is a second diagram illustrating a current flowing through the rotary machine control device and through the rotary machine when open phase determination is performed by the rotary machine control device according to the first embodiment of the present invention.
Figure 5:
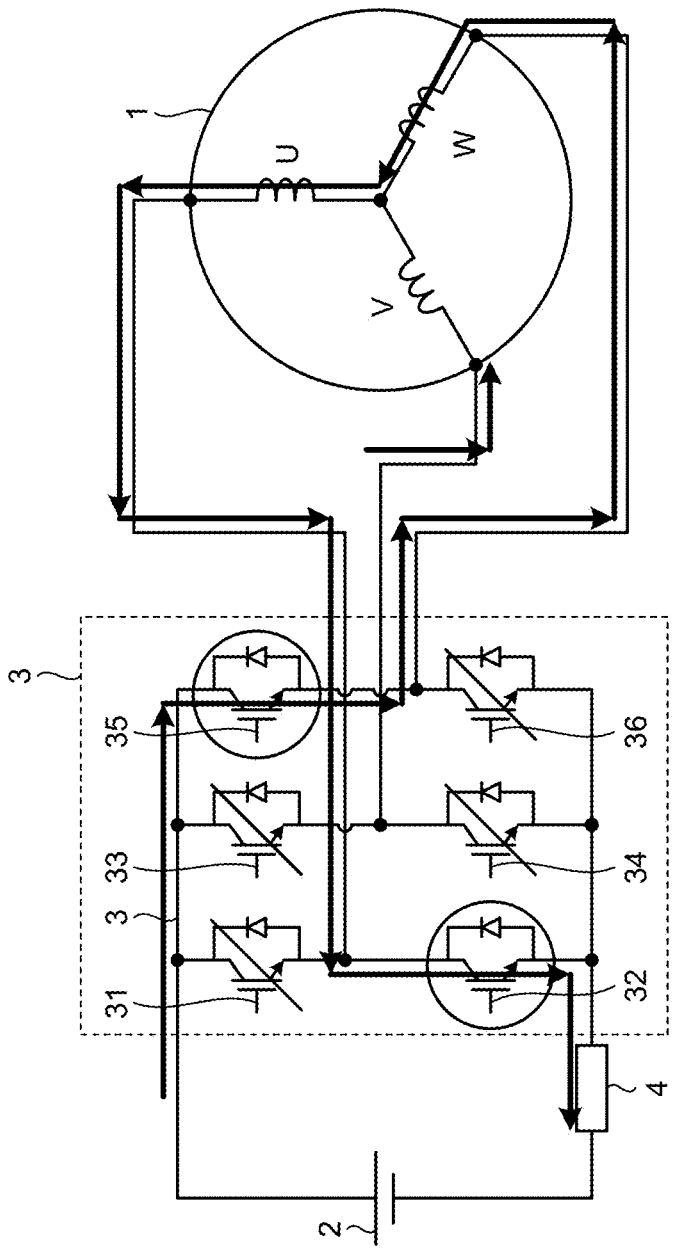
FIG. 5 is a third diagram illustrating a current flowing through the rotary machine control device and through the rotary machine when open phase determination is performed by the rotary machine control device according to the first embodiment of the present invention.

FIG. 3 is a first diagram illustrating a current flowing through the rotary machine control device 100 and through the rotary machine 1 when open phase determination is performed by the rotary machine control device 100 according to the first embodiment of the present invention. FIG. 4 is a second diagram illustrating a current flowing through the rotary machine control device 100 and through the rotary machine 1 when open phase determination is performed by the rotary machine control device 100 according to the first embodiment of the present invention. FIG. 5 is a third diagram illustrating a current flowing through the rotary machine control device 100 and through the rotary machine 1 when open phase determination is performed by the rotary machine control device 100 according to the first embodiment of the present invention. FIGS. 3 to 5 illustrate the rotary machine 1 being connected in Y connection. FIGS. 3 to 5 illustrate a switching device that is turned on as a circled switching device. In addition, FIGS. 3 to 5 illustrate a switching device that is turned off as a diagonally stroked switching device. FIGS. 3 to 5 indicate the flow of current by an arrow.

In FIG. 3, the switching devices 31 and 34 are turned on, and the switching devices 32, 33, 35, and 36 are turned off, thereby causing a current to flow between phase U and phase V of the rotary machine 1. In FIG. 4, the switching devices 33 and 36 are turned on, and the switching devices 31, 32, 34, and 35 are turned off, thereby causing a current to flow between phase V and phase W of the rotary machine 1. In FIG. 5, the switching devices 32 and 35 are turned on, and the switching devices 31, 33, 34, and 36 are turned off, thereby causing a current to flow between phase W and phase U of the rotary machine 1. Such control on the switching devices 31 to 36 is performed based on a voltage command to apply a voltage between phases of the rotary machine 1, output by the control unit 5.

Figure 6:
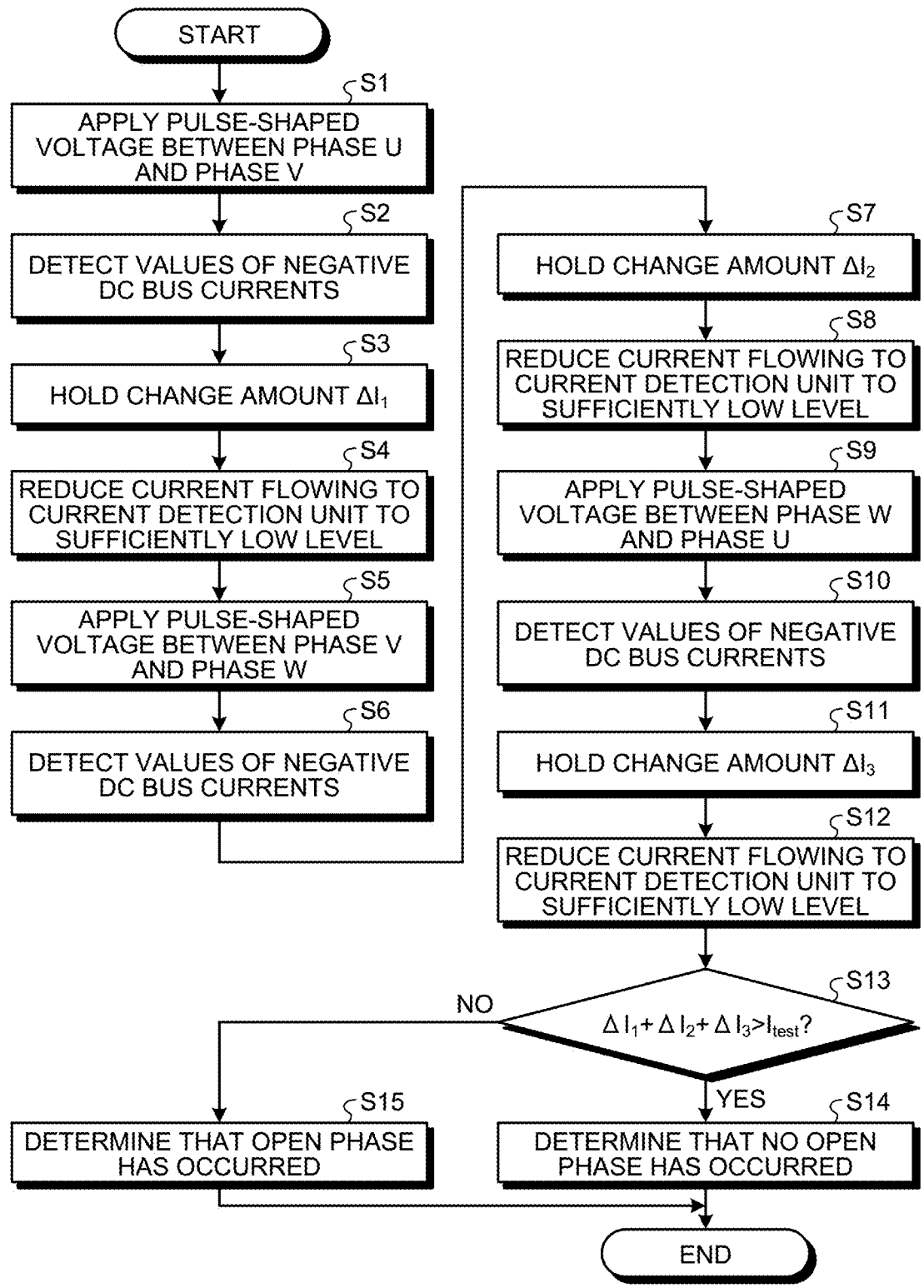
FIG. 6 is a flowchart illustrating a flow of the open phase determination according to the first embodiment of the present invention.

A method of open phase determination performed by the rotary machine control device 100 will now be described. FIG. 6 is a flowchart illustrating a flow of the open phase determination according to the first embodiment of the present invention. The voltage application unit 3 turns on the switching devices 31 and 34 and turns off the switching devices 32, 33, 35, and 36 for a predetermined time period to apply a pulse-shaped voltage between phase U and phase V of the rotary machine 1 (step S1). The open phase determination unit 6 monitors the voltage command output by the control unit 5 and the current information output by the current detection unit 4, and detects the value of the negative DC bus current before the application of the pulse-shaped voltage between phase U and phase V, and the value of the negative DC bus current after the application of the pulse-shaped voltage between phase U and phase V (step S2).

The open phase determination unit 6 holds, as a change amount $\Delta I_1$, the difference between the value of the negative DC bus current before the application of the pulse-shaped voltage between phase U and phase V and the value of the negative DC bus current after the application of the pulse-shaped voltage between phase U and phase V (step S3). The voltage application unit 3 turns off the switching devices 31 to 36 to reduce the current flowing to the current detection unit 4 to a sufficiently low level (step S4). A detailed description will be given later of the value of a current caused to flow between phases, such as phase U and phase V, by turning on or off of each of the switching devices 31 to 36.

The voltage application unit 3 turns on the switching devices 33 and 36 and turns off the switching devices 31, 32, 34, and 35 for a predetermined time period to apply a pulse-shaped voltage between phase V and phase W of the rotary machine 1 (step S5). The open phase determination unit 6 monitors the voltage command output by the control unit 5 and the current information output by the current detection unit 4, and detects the value of the negative DC bus current before the application of the pulse-shaped voltage between phase V and phase W, and the value of the negative DC bus current after the application of the pulse-shaped voltage between phase V and phase W (step S6). The open phase determination unit 6 holds, as a change amount $\Delta I_2$, the difference between the value of the negative DC bus current before the application of the pulse-shaped voltage between phase V and phase W and the value of the negative DC bus current after the application of the pulse-shaped voltage between phase V and phase W (step S7). The voltage application unit 3 turns off the switching devices 31 to 36 to reduce the current flowing to the current detection unit 4 to a sufficiently low level (step S8).

The voltage application unit 3 turns on the switching devices 32 and 35 and turns off the switching devices 31, 33, 34, and 36 for a predetermined time period to apply a pulse-shaped voltage between phase W and phase U of the rotary machine 1 (step S9). The open phase determination unit 6 monitors the voltage command output by the control unit 5 and the current information output by the current detection unit 4, and detects the value of the negative DC bus current before the application of the pulse-shaped voltage between phase W and phase U, and the value of the negative DC bus current after the application of the pulse-shaped voltage between phase W and phase U (step S10). The open phase determination unit 6 holds, as a change amount $\Delta I_3$, the difference between the value of the negative DC bus current before the application of the pulse-shaped voltage between phase W and phase U and the value of the negative DC bus current after the application of the pulse-shaped voltage between phase W and phase U (step S11). The voltage application unit 3 turns off the switching devices 31 to 36 to reduce the current flowing to the current detection unit 4 to a sufficiently low level (step S12).

The open phase determination unit 6 performs open phase determination by comparing the sum of the values of the currents flowing between respective pairs of phases of the rotary machine 1, with a predetermined reference value. The open phase determination unit 6 determines whether the value of $\Delta I_1+\Delta I_2+\Delta I_3$ is greater than a reference value $I_{test}$ (step S13). If the value of $\Delta I_1+\Delta I_2+\Delta I_3$ is greater than $I_{test}$ (Yes at step S13), the open phase determination unit 6 determines that no open phase has occurred (step S14). If the value of $\Delta I_1+\Delta I_2+\Delta I_3$ is less than or equal to $I_{test}$ (No at step S13), the open phase determination unit 6 determines that an open phase has occurred (step S15).

The reference value $I_{test}$ is calculated based on the inductance value L of each phase of the rotary machine 1 and on the duration of application of the pulse-shaped voltage. A step input of a voltage V to a load RL will cause a current response to start with a slope of V/L. Thus, in a case of, for example, the rotary machine 1 being in Y connection, the amount $\Delta I_1$ is calculated by Equation (1) below unless no open phase has occurred between phase U and phase V.

$$\Delta I_1 = V_{dc}/(2 \times L) \tag{1}$$

The amounts $\Delta I_2$ and $\Delta I_3$ are also calculated using the same formula as the right side of Equation (1) unless no open phase has occurred between phases. The reference value $I_{test}$ is represented by, for example, Equation (2) below.

$$I_{test} = 3 \times V_{dc}/(2 \times L) \tag{2}$$

Because the amounts $\Delta I_1$, $\Delta I_2$, and $\Delta I_3$ have the same value in Equation (2), the sum thereof is expressed as a threefold value of $\Delta I_1$. Note that the reference value $I_{rest}$ may include a suitable margin above the value represented by Equation (2). The value including a suitable margin is determined in consideration of accuracy of detection of the current value by the current detection unit 4. The value of the reference value $I_{rest}$ including a suitable margin is a value lower than the value represented by the right side of Equation (2).

An advantage of the rotary machine control device 100 according to the first embodiment of the present invention will next be described. The method of performing open phase determination by the rotary machine control device 100 using the sum of $\Delta I_1$, $\Delta I_2$, and $\Delta I_3$ allows the open phase determination to be performed with higher accuracy than a method of determining, one by one, the condition of open phase between phase U and phase V, the condition of open phase between phase V and phase W, and the condition of open phase between phase W and phase U. The reason for this will next be described.

Figure 7:
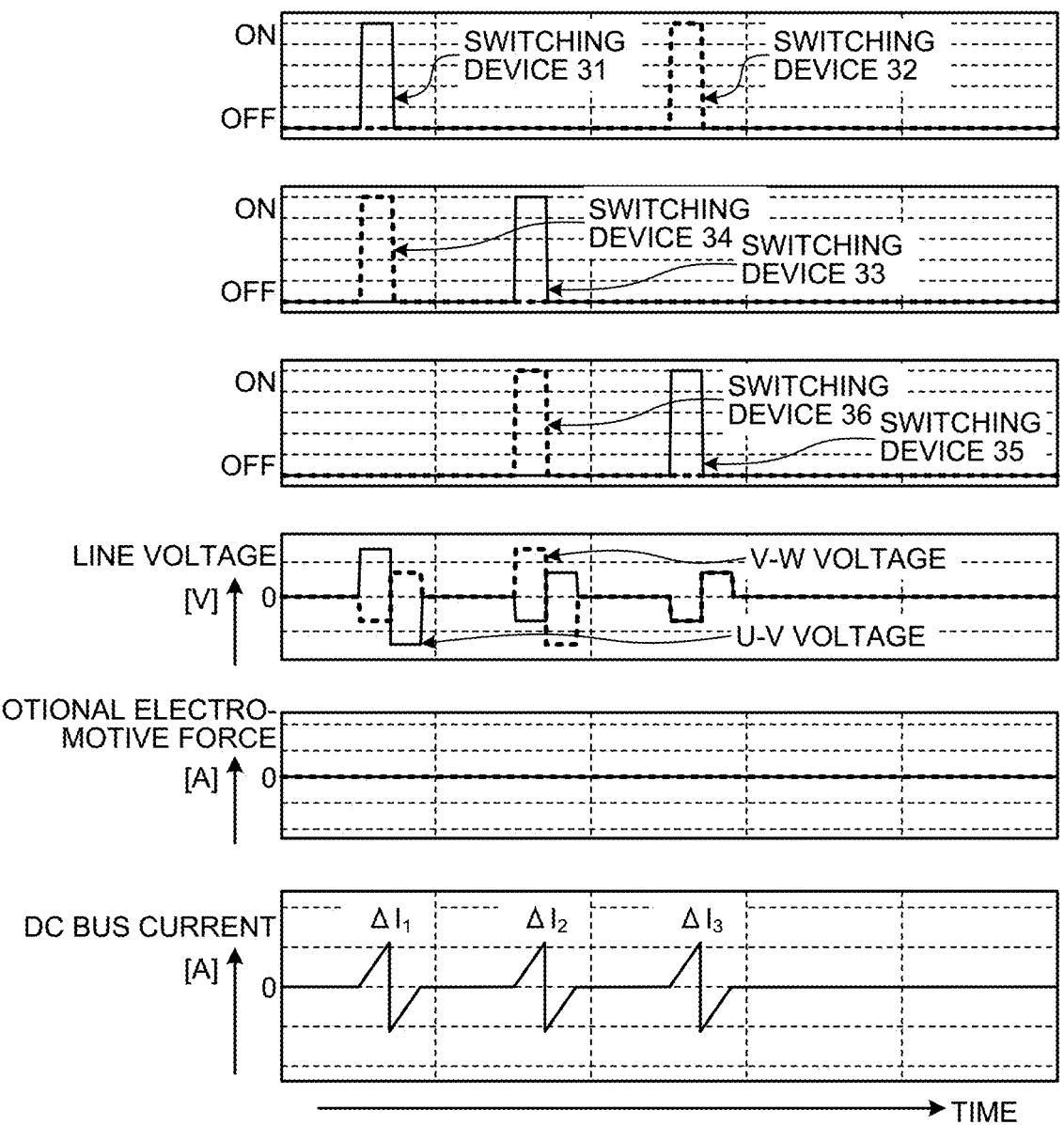
FIG. 7 is a diagram illustrating operations of switching devices, a line voltage, motional electromotive force, and a DC bus current when open phase determination is performed during stoppage of the rotary machine according to the first embodiment of the present invention.
Figure 8:
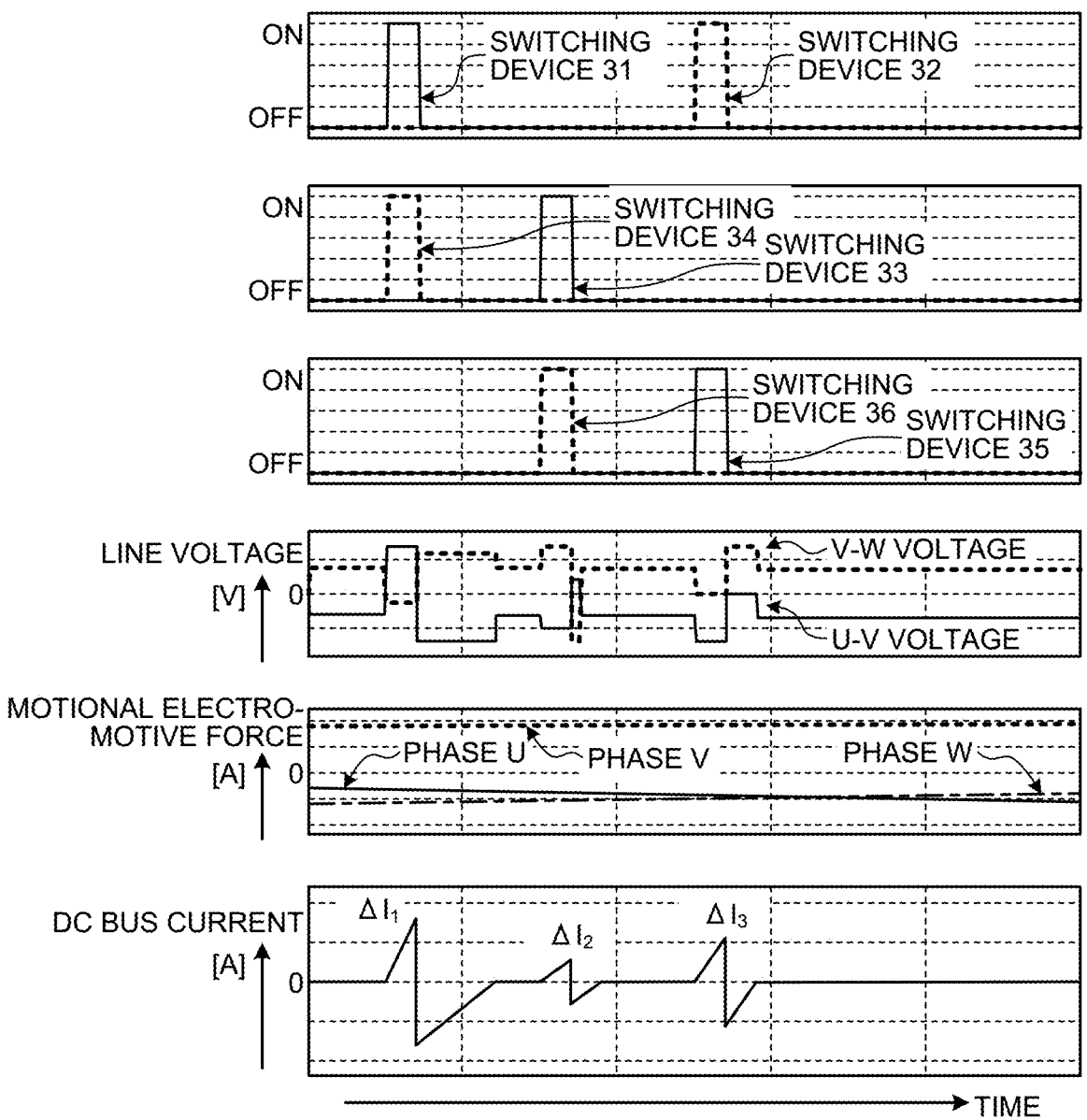
FIG. 8 is a diagram illustrating operations of switching devices, a line voltage, motional electromotive force, and a DC bus current when open phase determination is performed during rotation of the rotary machine according to the first embodiment of the present invention.

FIG. 7 is a diagram illustrating operations of the switching devices 31 to 36, a line voltage, motional electromotive force, and a DC bus current when open phase determination is performed during stoppage of the rotary machine 1 according to the first embodiment of the present invention. FIG. 8 is a diagram illustrating operations of the switching devices 31 to 36, a line voltage, motional electromotive force, and a DC bus current when open phase determination is performed during rotation of the rotary machine 1 according to the first embodiment of the present invention. FIGS. 7 and 8 each illustrate a current value and other characteristics when no open phase has occurred on a connection path between the rotary machine 1 and the rotary machine control device 100. In FIGS. 7 and 8, the horizontal axis represents time, and the vertical axis represents one of the operations of the switching devices 31 to 36, the line voltage, the motional electromotive force, and the DC bus current.

As illustrated in FIG. 7, no motional electromotive force is generated when the rotary machine 1 is stopped, thereby causing the change amounts $\Delta I_1$, $\Delta I_2$, and $\Delta I_3$ in the DC bus current to have almost the same values. This makes no difference in the result of the open phase determination between the case of use of the method of performing open phase determination by the rotary machine control device 100 and the case of performing open phase determination with respect to each of an open phase between phase U and phase V, an open phase between phase V and phase W, and an open phase between phase W and phase U. In contrast, as illustrated in FIG. 8, when the rotary machine 1 is rotating and motional electromotive force is generated, this motional electromotive force is added to the pulse-shaped voltage, thereby causing the change amounts $\Delta I_1$, $\Delta I_2$, and $\Delta I_3$ in the DC bus current obtained by the open phase determination unit 6 to differ from one another. Thus, the use of a method of performing open phase determination, one by one, with respect to an open phase between phase U and phase V, an open phase between phase V and phase W, and an open phase between phase W and phase U may lead to a determination that an open phase has occurred even when no open phase has occurred in the rotary machine 1 particularly at a phase in which the motional electromotive force acts to cancel the pulse-shaped voltage.

Note that the phase differences of 120° between phase U, phase V, and phase W make the three-phase vector sum of the motional electromotive force zero. In the present invention, calculation of the value of $\Delta I_1+\Delta I_2+\Delta I_3$ at step S13 allows the effect of the motional electromotive force to be eliminated. While the value of $\Delta I_1$ of FIG. 7 and the value of $\Delta I_1$ of FIG. 8 differ from each other, the value of $\Delta I_1+\Delta I_2+\Delta I_3$ of FIG. 7 and the value of $\Delta I_1+\Delta I_2+\Delta I_3$ of FIG. 8 are equal to each other. Thus, in the present invention, the effect of the motional electromotive force is cancelled, and the open phase determination unit 6 can therefore perform open phase determination with high accuracy even when the rotary machine 1 is rotating.

As described above, in the first embodiment of the present invention, the rotary machine control device 100 includes the voltage application unit 3, which applies a voltage to the three-phase rotary machine 1; the current detection unit 4, which outputs current information representing information on a current caused to flow to the rotary machine 1 by application of the voltage; the control unit 5, which outputs a voltage command to apply a voltage between each of pairs of phases of the rotary machine 1; and the open phase determination unit 6, which detects the values of the currents flowing between the respective pairs of phases by monitoring the voltage command and the current information, and compares the sum of the values of the currents flowing between the respective pairs of phases with a predetermined reference value to perform open phase determination to determine whether an open phase has occurred in the rotary machine 1. This enables the effect of the motional electromotive force to be cancelled even when the rotary machine 1 is rotating, and open phase determination to be performed with high accuracy even when the rotary machine 1 is rotating.

Second Embodiment

Figure 9:
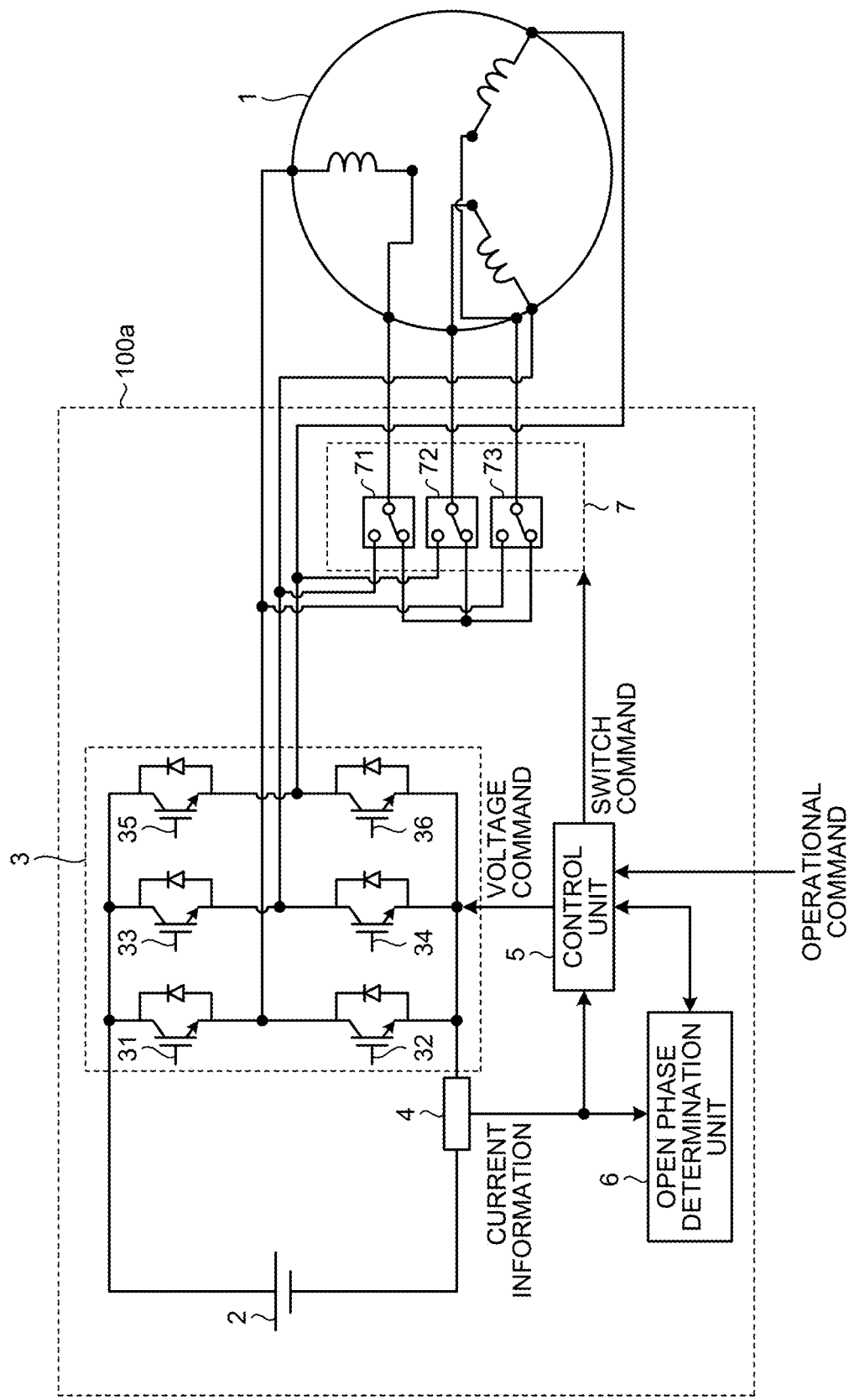
FIG. 9 is a diagram illustrating a configuration of a rotary machine control device according to a second embodiment of the present invention.

FIG. 9 is a diagram illustrating a configuration of a rotary machine control device 100a according to a second embodiment of the present invention. The rotary machine control device 100a further includes a connection switching unit 7 in addition to the components of the rotary machine control device 100. The connection switching unit 7 is a switching circuit for switching the connection configuration of the windings of the rotary machine 1, and includes switches 71 to 73. In addition, the connection switching unit 7 performs switching operation on the switches 71 to 73 during rotational movement of the rotary machine 1 to switch the connection scheme of the stator windings of the rotary machine 1. The connection configuration is switched by the control unit 5 by outputting of a switch command to the connection switching unit 7. The switches 71 to 73 may be configured using mechanical relays or may be configured using semiconductor switches. The second embodiment assumes that the switches 71 to 73 together switch the connection configuration of the rotary machine 1 between Y connection and Δ connection. The Δ connection is also written as delta connection.

An advantage of switching between Y connection and Δ connection of the windings of the rotary machine 1 will now be described. Equations (3) and (4) hold when the voltages across the windings of the respective phases are equal to one another, where $V_Y$ represents the line voltage and $I_Y$ represents the value of the current flowing into a winding, in the Y connection configuration, and $V_\Delta$ represents the line voltage and $I_\Delta$ represents the value of the current flowing into a winding, in the Δ connection configuration.

$$V_\Delta = V_Y/\sqrt{3} \quad (3)$$

$$I_\Delta = \sqrt{3} \times I_Y \quad (4)$$

When the voltage $V_Y$ and the current $I_Y$ in the Y connection configuration and the voltage $V_\Delta$ and the current $I_\Delta$ in the $\Delta$ connection configuration satisfy the relationships of Equations (3) and (4), the amount of power supplied to the rotary machine 1 in the Y connection configuration and the amount of power supplied to the rotary machine 1 in the $\Delta$ connection configuration are equal to each other. When the amounts of power supplied to the rotary machine 1 are equal to each other, the $\Delta$ connection configuration causes a higher current to flow into the windings, and requires a lower voltage for rotation of the rotary machine 1.

Such characteristics may lead to an idea of selecting a connection configuration of the windings depending on a load condition. For example, one possible method is that the Y connection configuration is selected at a low load to operate the rotary machine 1 at a low speed, while the $\Delta$ connection configuration is selected at a high load to operate the rotary machine 1 at a high speed. Such operation can improve operational efficiency with respect to power consumption at a low load, and allows the rotary machine 1 to provide a high output at a high load.

In this operation, there is a variation in the operational times of the switches 71 to 73 upon switching of the connection configuration of the windings. This requires a time from outputting of a switch command until completion of switching of the connection scheme of the windings. Thus, to control the rotary machine 1 depending on the connection scheme of the windings, the control unit 5 needs to determine whether the switching operations of the switches 71 to 73 are complete. A variation in the operational times of the switches 71 to 73 as described above causes the open phase determination unit 6 to determine that an open phase has occurred after start of operation of switching the windings even though no open phase has actually occurred, and to determine that no open phase has occurred after completion of operation of switching the windings. In the second embodiment, the control unit 5 uses this determination result from the open phase determination unit 6 to determine whether the switching operations of the switches 71 to 73 are complete.

Figure 10:
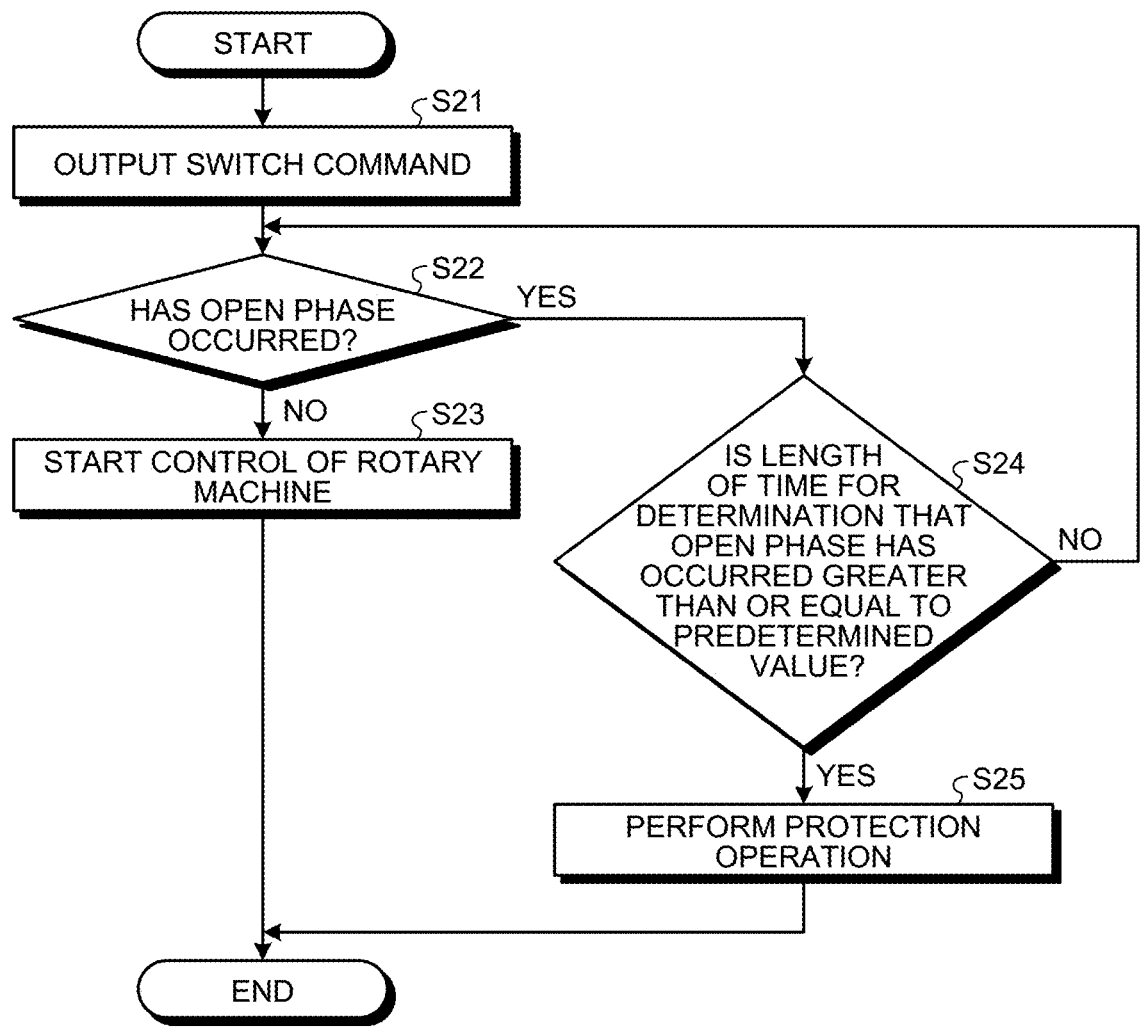
FIG. 10 is a flowchart illustrating a determination of completion of switching of the connection scheme of the windings, according to the second embodiment of the present invention.

FIG. 10 is a flowchart illustrating a determination of completion of switching of the connection scheme of the windings according to the second embodiment of the present invention. The control unit 5 outputs a switch command to the connection switching unit 7 during rotation of the rotary machine 1 (step S21). Upon reception of the switch command, the connection switching unit 7 operates the switches 71 to 73. The open phase determination unit 6 performs open phase determination described in the first embodiment to determine whether an open phase has occurred (step S22). If the open phase determination unit 6 determines that no open phase has occurred (No at step S22), the control unit 5 determines that the switching operations of the switches 71 to 73 are complete, starts control of the rotary machine 1 depending on the connection configuration of the windings (step S23), and terminates the processing of determination of whether the switching operations are complete. Specifically, in a case in which the result of the open phase determination indicates no occurrence of open phase, the control unit 5 outputs, to the voltage application unit 3, a voltage command dependent on the connection configuration of the windings resulting from the switching, of the rotary machine 1. In a case in which the open phase determination unit 6 determines that an open phase has occurred (Yes at step S22), the control unit 5 determines whether the length of time for determination that an open phase has occurred is greater than or equal to a predetermined value (step S24). If the length of time for determination that an open phase has occurred is greater than or equal to the predetermined value (Yes at step S24), the control unit 5 performs protection operation such as stopping of the rotary machine 1 and/or fault notification (step S25), and then terminates the process.

In a case in which the length of time for determination that an open phase has occurred is greater than or equal to the predetermined value, it is considered that such determination results from actual occurrence of an open phase, rather than from the operation of switching of the windings. The control unit 5 therefore performs operation of step S25. The length of time for determination that an open phase has occurred can be obtained by, for example, calculation by the control unit 5 of the difference between the time when the operation of step S24 was performed and the time when the control unit 5 outputted the switch command. If the length of time for determination that an open phase has occurred is not greater than or equal to the predetermined value (No at step S24), the process returns to step S22.

As described above, switching the windings as in the flowchart illustrated in FIG. 10 allows the timing of actual completion of switching of the connection of the windings to be known, thereby enabling the control unit 5 to rotate the rotary machine 1 using a control gain dependent on the connection scheme.

The open phase determination unit 6 performs the open phase determination in a similar manner to the first embodiment. Note that the value of the reference value $I_{test}$ needs to be set to an appropriate value when the rotary machine 1 is to be switched to $\Delta$ connection considering that the impedance between phases in $\Delta$ connection is one third (⅓) of the impedance between phases in Y connection. That is, the value of the reference value $I_{test}$ that is used when the rotary machine 1 is to be switched from Y connection to $\Delta$ connection needs to be greater than the value of the reference value $I_{test}$ that is used when the rotary machine 1 is to be switched from $\Delta$ connection to Y connection.

As described above, in the second embodiment of the present invention, the rotary machine control device 100a further includes the switches 71 to 73 for switching the connection configuration of the windings of the rotary machine 1, in addition to the components of the rotary machine control device 100. The control unit 5 operates the switches 71 to 73 during rotation of the rotary machine 1, and when the result of the open phase determination indicates no occurrence of open phase, outputs, to the voltage application unit 3, a voltage command dependent on the connection configuration of the windings resulting from the switching, of the rotary machine 1. This enables the rotary machine 1 to quickly and stably switch the connection configuration of the windings of the rotary machine 1 during rotation thereof without stopping the rotary machine 1, and thus enables the rotary machine 1 to continue the operation even when there is a variation in the operations of the switches 71 to 73.

In addition, the switches 71 to 73 together switch the connection configuration of the windings of the rotary machine 1 between the Y connection mode and the $\Delta$ connection mode. The reference value that is used when the switches 71 to 73 together switch the connection configuration of the windings of the rotary machine 1 from the Y connection mode to the $\Delta$ connection mode is set to a value greater than the reference value that is used when the switches 71 to 73 together switch the connection configuration of the windings of the rotary machine 1 from the $\Delta$ connection mode to the Y connection mode. This can reduce or prevent reduction in accuracy of determination of completion of switching of the connection configuration of the windings.

Third Embodiment

Figure 11:
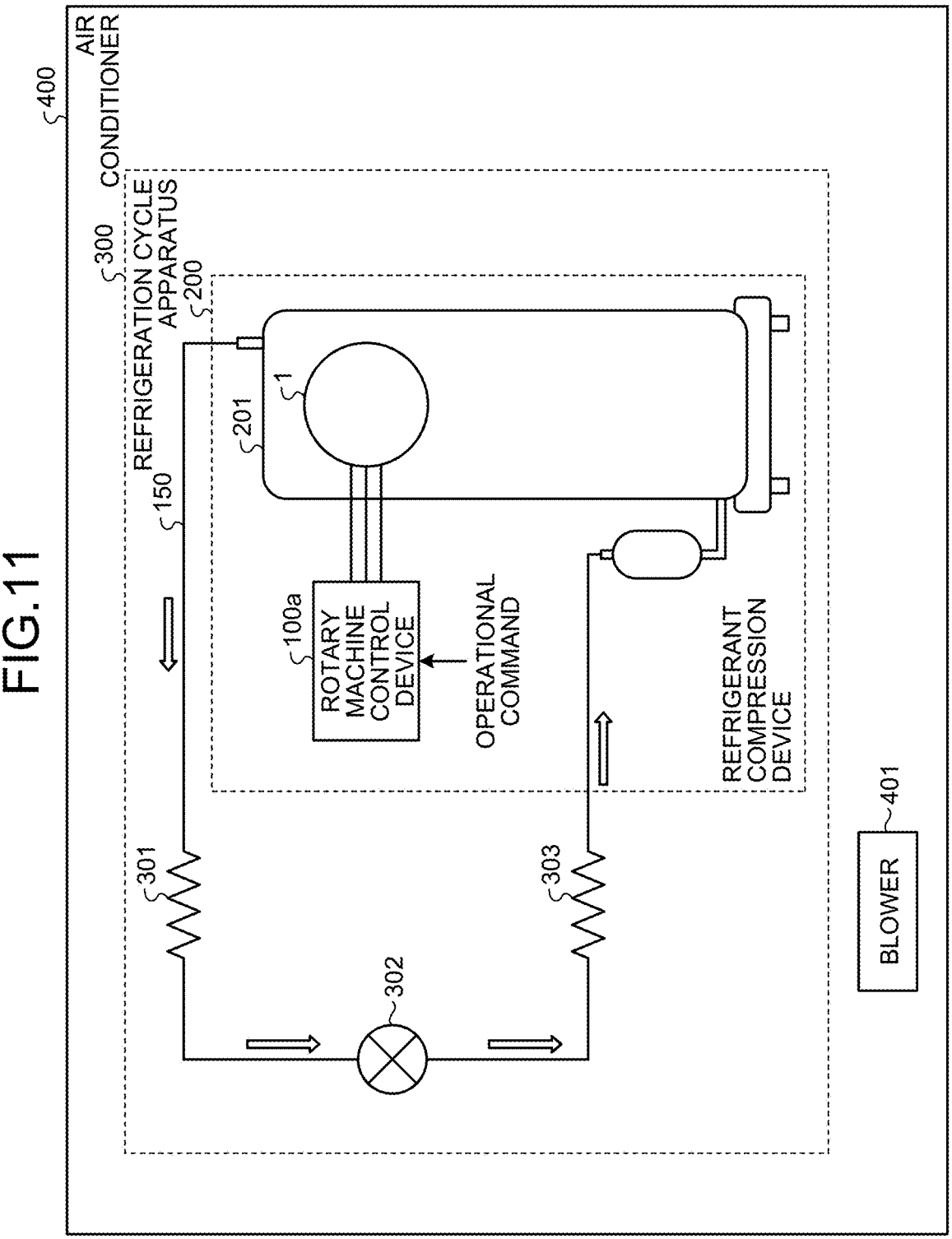
FIG. 11 is a diagram illustrating a configuration of an air conditioner according to a third embodiment of the present invention.

FIG. 11 is a diagram illustrating a configuration of an air conditioner 400 according to a third embodiment of the present invention. The air conditioner 400 includes a refrigeration cycle apparatus 300 and a blower 401. The refrigeration cycle apparatus 300 includes a refrigerant compression device 200, a condenser 301, an expansion valve 302, and an evaporator 303. The refrigerant compression device 200 includes a compressor 201 and the rotary machine control device 100a.

As illustrated in FIG. 11, the compressor 201 and the condenser 301 are connected to each other by a refrigerant pipe 150. Similarly, the condenser 301 and the expansion valve 302, the expansion valve 302 and the evaporator 303, and the evaporator 303 and the compressor 201 are also connected to each other by the refrigerant pipe 150. This configuration allows a refrigerant to circulate through the compressor 201, the condenser 301, the expansion valve 302, and the evaporator 303.

To allow the compressor 201 to compress refrigerant gas and make high-pressure gas, a three-phase AC voltage is applied from the rotary machine control device 100a to the rotary machine 1. The rotary machine 1 is controlled by the rotary machine control device 100a to operate at a variable speed. The rotary machine 1 is connected with the connection switching unit 7 (not illustrated) for switching the connection configuration of the stator windings.

The refrigeration cycle apparatus 300 repeatedly performs a process of evaporation, compression, condensation, and expansion of the refrigerant. The refrigerant changes its state from liquid to gas, and then from gas to liquid, which causes heat exchange to occur between the refrigerant and external air, which refers to air outside the air conditioner 400. Thus, a combination of the refrigeration cycle apparatus 300 and the blower 401, which circulates external air and air inside the air conditioner 400, forms the air conditioner 400.

The evaporator 303 evaporates refrigerant liquid under a low-pressure condition, thereby removing heat from air around the evaporator 303 to provide cooling action. To condensate the refrigerant, the compressor 201 compresses refrigerant gas, gasified by the evaporator 303, through rotation of the rotary machine 1 to transform the refrigerant gas into high-pressure gas. The condenser 301 dissipates heat of the refrigerant gas, heated to a high temperature in the compressor 201, to condensate the high-pressure refrigerant gas and to transform the refrigerant gas into refrigerant liquid. The expansion valve 302 throttles and expands the refrigerant liquid to transform the refrigerant liquid into low-pressure liquid to make the refrigerant liquid evaporable in the evaporator 303.

In recent years, air conditioners are required not only to provide comfort, but also to achieve a higher efficiency due to stricter restrictions for energy saving year by year. It is therefore important for the refrigeration cycle apparatus 300 to operate the rotary machine 1 with a high efficiency in a wide speed range from a low speed to a high speed. Based on this, a configuration that allows the connection configuration of the stator windings of the rotary machine 1 to be switched depending on the rotational speed of the rotary machine 1 can reduce power loss of the voltage application unit 3. When there is a large difference between the room temperature of the room where the air conditioner 400 is installed and the set temperature, high-speed operation is performed in which the rotary machine 1 is rotated at a high speed to quickly bring the room temperature to near the set temperature, and when the room temperature is near the set temperature, low-speed operation is performed in which the rotary machine 1 is rotated at a low speed, allowing the room temperature to be maintained. Such control of the rotary machine 1 by the rotary machine control device 100a leads to a proportion of time of low-speed operation to be higher than the proportion of time of high-speed operation, of the total operation time of the air conditioner 400.

The rotary machine 1 will have greater motional electromotive force at a higher rotational speed, requiring a higher voltage value for rotation. The motional electromotive force is greater in the Y connection configuration than in the Δ connection configuration. Thus, conceivable techniques for preventing an increase in the motional electromotive force during high-speed operation of the rotary machine 1 may include reduction in the magnetic force of the permanent magnet and reduction in the number of turns of the windings. But these techniques cause an increase in the current for generating a torque of the same output, thereby increasing the current flowing through the rotary machine 1 and through voltage application unit 3. This reduces operational efficiency with respect to power consumption, of the rotary machine 1. In addition, in a case in which an increase in the motional electromotive force has caused the voltage value required for rotation of the rotary machine 1 to exceed the voltage of the DC voltage source 2, flux-weakening control is generally used to provide the voltage required for rotation of the rotary machine 1. However, use of flux-weakening control will cause a reactive current, which makes no contribution to torque generation, to flow through the rotary machine 1 and through the voltage application unit 3, thereby reducing operational efficiency with respect to power consumption, of the rotary machine 1.

In this point, one solution is that the connection configuration of the windings of the rotary machine 1 is switched depending on the rotational speed. For example, when high-speed operation is required, the Δ connection configuration is used as the windings of the rotary machine 1. As described in the second embodiment, configuring the windings in the Δ connection configuration can reduce the voltage required for rotation of the rotary machine 1 to $1/\sqrt{3}$ times the voltage required for rotation of the rotary machine 1 in the Y connection configuration. Thus, the voltage required for rotation of the rotary machine 1 can be reduced by use of the Δ connection configuration as the connection configuration of the windings without reducing the magnetic force of the permanent magnet or reducing the number of turns of the windings. Moreover, use of the Δ connection configuration as the connection configuration of the windings eliminates the need of flux-weakening control.

Meanwhile, in low-speed rotation, configuring the windings in the Y connection configuration can reduce the current value to $1/\sqrt{3}$ times the current value in the Δ connection configuration. In addition, by designing the rotary machine 1 to adapt to low-speed rotation when the windings are in the Y connection configuration, the current value can be lower than when the rotary machine 1 is used with the windings in the Y connection configuration over the entire speed range. This allows the power loss of the voltage application unit 3 to be reduced, and operational efficiency with respect to power consumption, of the rotary machine 1, to be improved.

As described above, switching of the connection configuration of the windings depending on a load condition is advantageous. However, if the rotational movement of the rotary machine 1 is once stopped to switch the connection configuration of the windings while the rotary machine 1 is driving the compressor 201 of the air conditioner 400, restarting requires an increased torque, which may result in failure in starting the rotary machine 1. Accordingly, to switch the connection configuration of the windings after once stopping the rotational movement of the rotary machine 1, the rotary machine 1 will need to be restarted after waiting several minutes to stabilize the state of the refrigerant. However, restarting after the refrigerant has stabilized may result in failure in pressurization of the refrigerant, which may prevent the room temperature from being maintained at a constant temperature due to reduced cooling or heating capability. It is therefore preferred that the control unit 5 switch the connection configuration of the windings of the rotary machine 1 during rotation of the rotary machine 1.

When the rotary machine 1 is rotating, the technology described in Patent Literature 1 does not allow sufficient accuracy for practical use to be achieved in the open phase determination due to lack of consideration of the effect of the motional electromotive force. This will increase risk of failure of the refrigeration cycle apparatus 300 caused by unnecessary stoppage of the compressor 201 due to a false determination in open phase detection, or by operation in a wrong connection configuration.

The air conditioner 400 according to the third embodiment includes the rotary machine control device 100a described in the second embodiment. Thus, whether an open phase has occurred or not can be correctly determined after switching of the connection configuration of the windings during rotation of the rotary machine 1. This can reduce unnecessary stoppage of the compressor 201 and risk of failure of the refrigeration cycle apparatus 300.

As described above, in the third embodiment of the present invention, the refrigerant compression device 200 includes the three-phase rotary machine 1; the compressor 201, which compresses refrigerant gas through rotation of the rotary machine 1; and the rotary machine control device 100a, which applies a voltage between phases of the rotary machine 1. This enables the rotary machine 1 to quickly and stably switch the connection configuration of the windings during rotation owing to the inclusion of the rotary machine control device 100a even when the refrigerant compression device 200 includes a device subjected to a high refrigerant load such as the compressor 201. In addition, owing to the inclusion of the refrigerant compression device 200, the air conditioner 400 is capable of operating with a high efficiency over a wide speed range while providing comfort.

Note that the refrigerant compression device 200 has been described herein as an application example of the rotary machine control device 100a including the open phase determination unit 6, but the rotary machine control device 100a of the present application is also useful in other mechanical devices. For example, the rotary machine control device 100a may be used with a mechanical device such as a fan or a pump.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 1 rotary machine; 2 DC voltage source; 3 voltage application unit; 4 current detection unit; 5 control unit; 6 open phase determination unit; 7 connection switching unit; 31-36 switching device; 71-73 switch; 100, 100a rotary machine control device; 150 refrigerant pipe; 200 refrigerant compression device; 201 compressor; 300 refrigeration cycle apparatus; 301 condenser; 302 expansion valve; 303 evaporator; 400 air conditioner; 401 blower; 500 control circuit; 500a processor; 500b memory.

The invention claimed is:

1. A rotary machine control device comprising:
  a voltage application circuitry to apply a voltage to a rotary machine with three phases;
  a current detector to detect a current flowing through a direct current bus of the voltage application circuitry and output current information based on the current detected, the current information representing information on a current caused to flow to the rotary machine by application of the voltage;
  a controller to output a voltage command to sequentially apply a pulse-shaped voltage between each of pairs of the phases of the rotary machine; and
  an open phase determiner to perform open phase determination to determine whether an open phase occurs in the rotary machine, by detecting values of currents flowing between the respective pairs of the phases by monitoring the voltage command and the current information, and by comparing a sum of the values of the currents flowing between the respective pairs of the phases with a predetermined reference value, wherein
  the open phase determiner holds amounts of change in the respective currents detected by the current detector each between before application of the pulse-shaped voltage applied between a corresponding pair of the phases and after the application of the pulse-shaped voltage applied between the corresponding pair of the phases, and performs the open phase determination to determine whether an open phase occurs in the rotary machine, by comparing a sum of the held amounts of change in the values of the respective currents between the respective pairs of the phases with the predetermined reference value.

2. The rotary machine control device according to claim 1, wherein
  the rotary machine control device includes a plurality of switches to switch a connection configuration of windings of the rotary machine, and
  the controller operates the plurality of switches during rotation of the rotary machine, and when a result of the open phase determination indicates no occurrence of open phase, outputs, to the voltage application circuitry, the voltage command dependent on a connection configuration of windings resulting from switching, of the rotary machine.

3. The rotary machine control device according to claim 2, wherein
  the plurality of switches switch the connection configuration of windings of the rotary machine between a Y connection mode and a delta (Δ) connection mode, and
  the reference value that is used when the plurality of switches switch the connection configuration of windings of the rotary machine from the Y connection mode to the Δ connection mode is greater than the reference value that is used when the plurality of switches switch the connection configuration of windings of the rotary machine from the Δ connection mode to the Y connection mode.

4. A refrigerant compression device comprising:
a rotary machine with three phases;
a compressor to compress refrigerant gas by rotation of the rotary machine; and
the rotary machine control device to apply a voltage to the rotary machine, according to claim 3.

5. A refrigerant compression device comprising:
a rotary machine with three phases;
a compressor to compress refrigerant gas by rotation of the rotary machine; and
the rotary machine control device to apply a voltage to the rotary machine, according to claim 2.

6. A refrigeration cycle apparatus comprising:
the refrigerant compression device according to claim 5;
a condenser to condense refrigerant gas at a high pressure to transform the refrigerant gas into refrigerant liquid by dissipating heat of the refrigerant gas heated to a high temperature in the compressor;
an expansion valve to throttle and expand the refrigerant liquid to transform the refrigerant liquid into low-pressure liquid to make the refrigerant liquid evaporable; and
an evaporator to evaporate the refrigerant liquid under a low-pressure condition to remove heat from ambient air.

7. An air conditioner comprising the refrigeration cycle apparatus according to claim 6.

\* \* \* \* \*